Sept. 18, 1928.  
C. H. LAND  
1,684,836  
HYDRAULIC BRAKE AND COUPLING DEVICE FOR TRACTOR TRAILERS  
Filed April 24, 1926  3 Sheets-Sheet 1
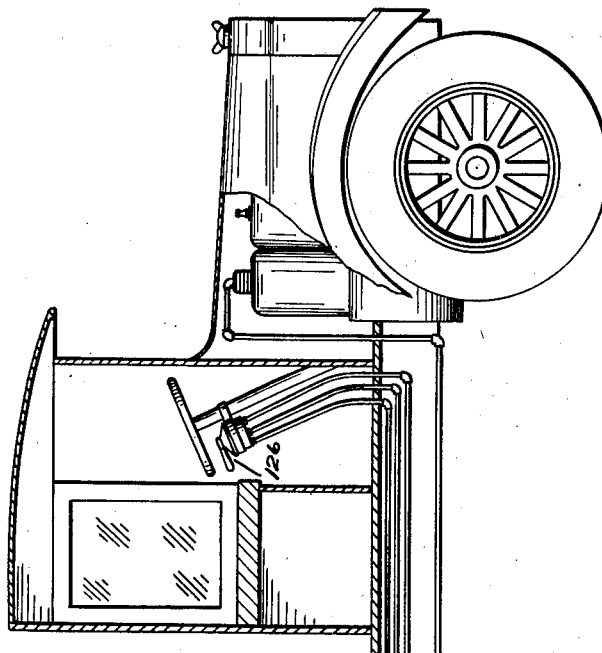
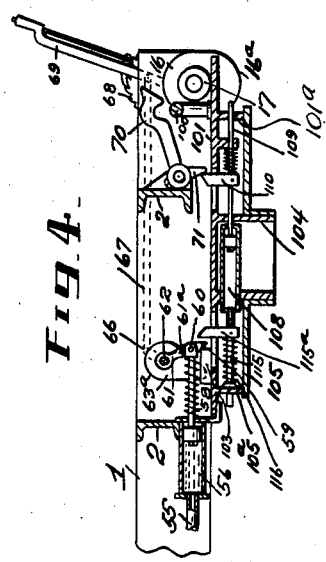
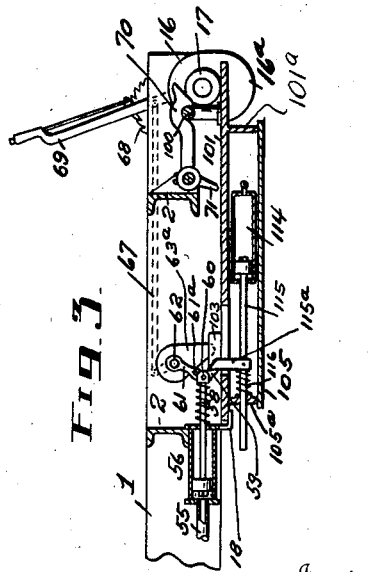
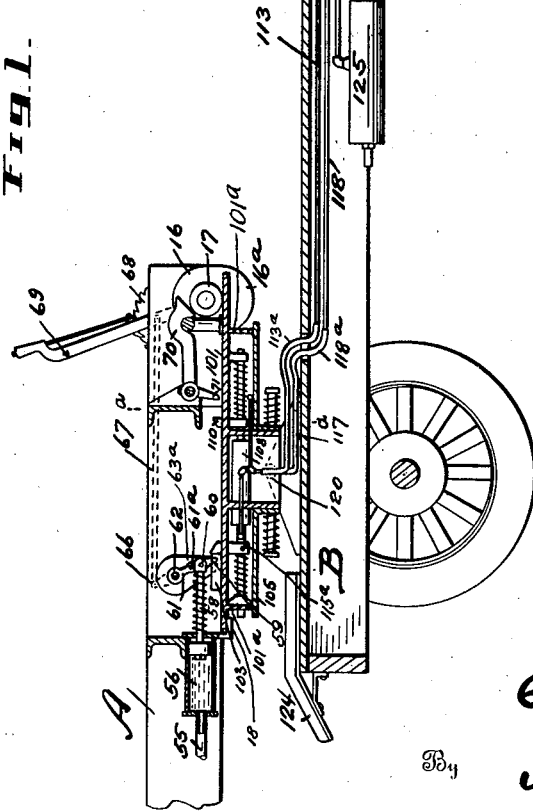
Inventor  
Charles H. Land  
By P. E. Thomas  
Attorney Sept. 18, 1928.
C. H. LAND
1,684,836
HYDRAULIC BRAKE AND COUPLING DEVICE FOR TRACTOR TRAILERS
Filed April 24, 1926   3 Sheets-Sheet 2
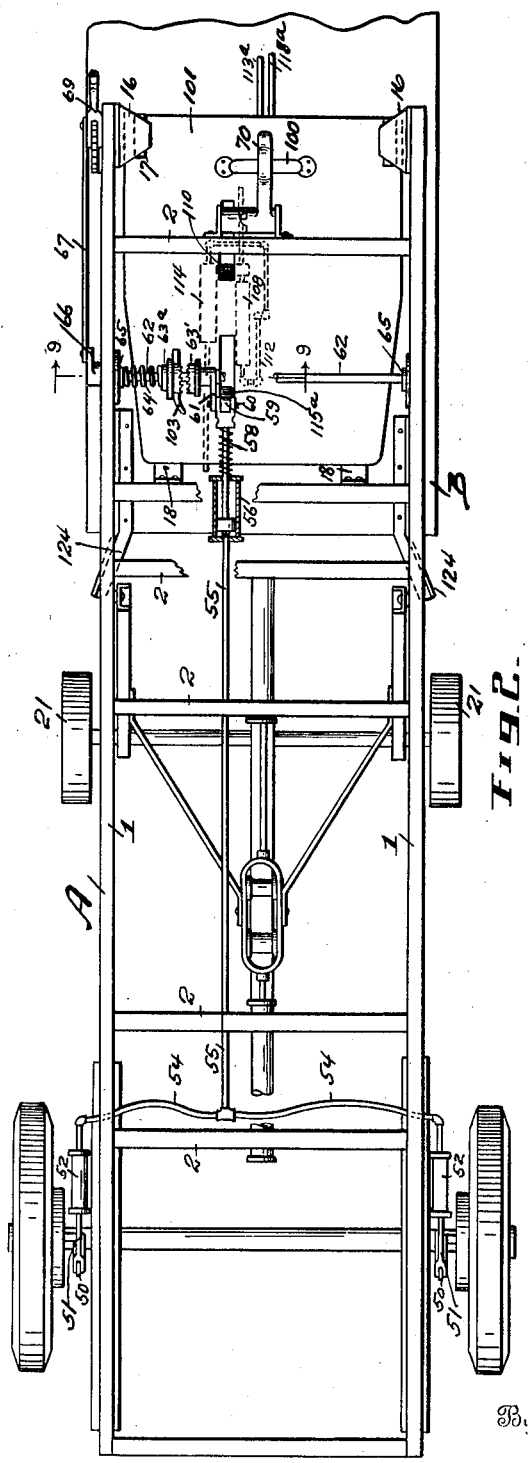
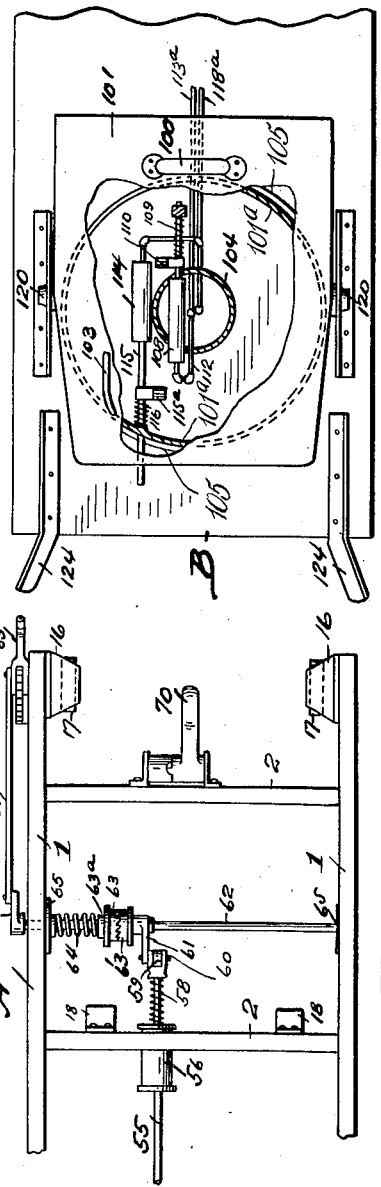
Inventor
Charles H. Land
By S. E. Thomas
Attorney Sept. 18, 1928.
C. H. LAND
1,684,836
HYDRAULIC BRAKE AND COUPLING DEVICE FOR TRACTOR TRAILERS
Filed April 24, 1926    3 Sheets-Sheet 3
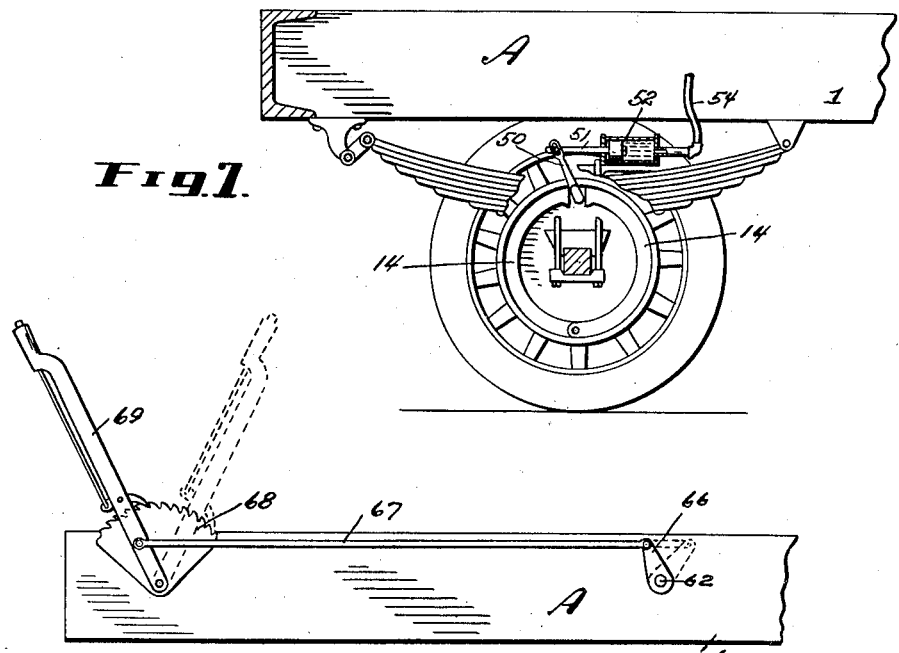
Fig.7.
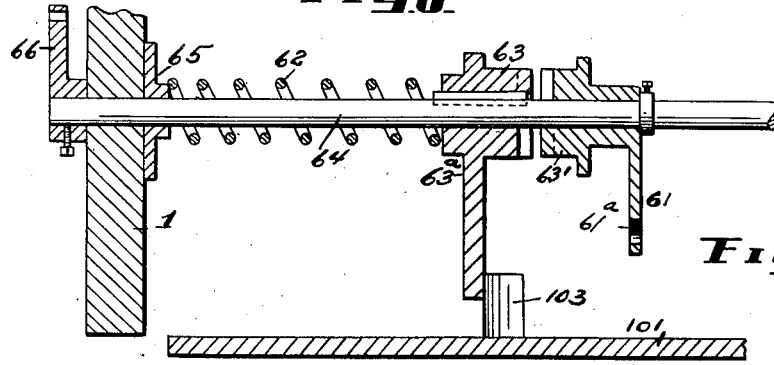
Fig.8.
Fig.9.
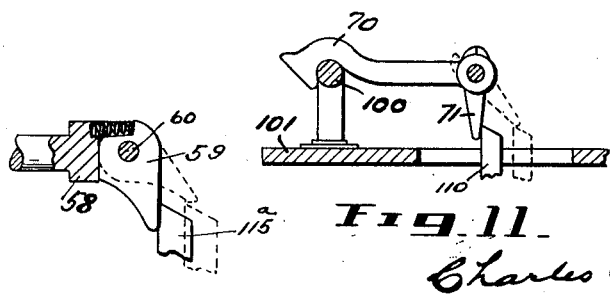
Fig.10.    Fig.11.
Inventor
Charles H. Land
By S. E. Thomas
Attorney Patented Sept. 18, 1928.

1,684,836

UNITED STATES PATENT OFFICE.

CHARLES H. LAND, OF DETROIT, MICHIGAN.

HYDRAULIC BRAKE AND COUPLING DEVICE FOR TRACTOR TRAILERS.

Application filed April 24, 1926. Serial No. 104,333.

This invention relates to a combined air and hydraulic braking and coupling system for tractor-trailers shown in the accompanying drawings and more particularly described in the following specification and claims.

The primary object of the present invention is to provide a braking and coupling mechanism,—one part being on the tractor and another part on the trailer adapted to co-ordinate for braking action and disengagement,—coincident with the coupling or uncoupling of the tractor to the trailer.

A further object of the invention is to provide the trailer with manually operated means adapted to actuate the hydraulic brake mechanism on the trailer and to lock the same when set, with means on the tractor for automatically releasing said brake locking mechanism upon coupling the tractor to the trailer.

A further object of the invention is to provide a hydraulic braking system on the trailer actuated by an air cylinder on the tractor connected with an air compressor through a controlling valve also carried on the tractor.

A further object is to provide the trailer with a suitable coupling latch, adapted to engage a co-operating coupling bar carried by the fifth wheel of the tractor,—with means for raising said latch to release the tractor from the trailer when desired.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a diagrammatic side elevation and longitudinal sectional view through a tractor and a fragment of the forward end of a trailer, coupled to the tractor, showing an air reservoir, an air controlling valve, and "leads" to a coupling latch releasing cylinder and brake cylinder.

Figure 2 is a plan view of a trailer,—its forward end supported upon the fifth wheel of a tractor, to which it is coupled.

Figure 3 is a diagrammatic longitudinal vertical sectional view through the forward end of the trailer and the fifth wheel of the tractor showing the coupling latch hook of the trailer engaging the coupling bar of the tractor also a manually operated lever for controlling the hydraulic brake mechanism of the trailer.

Figure 4 is a similar view showing the coupling latch hook raised.

Figure 5 is a fragmentary plan view of the forward end of the trailer frame showing the lever for manually setting the brake and the clutch in interlocking relation.

Figure 6 is a fragmentary plan view of the rear end of the tractor with a portion of the upper turn-plate broken away to disclose the lower rocking plate of the turn-table and air cylinder for controlling the coupling and braking mechanism.

Figure 7 is a fragmentary sectional elevation of the rear end of the trailer with parts broken away showing the hydraulic brake cylinder and cams for operating the brakes on the rear wheels.

Figure 8 is a fragmentary elevation of the trailer showing the manually operated lever for actuating the hydraulic brake mechanism, and in dotted lines the position occupied by the lever when manually releasing the brake mechanism.

Figure 9 is a detail sectional view through the clutch mechanism and upper turn-plate of the fifth wheel, taken on or about line 9—9 of Figure 2, showing the clutch released.

Figure 10 is a fragmentary sectional elevation of the spring actuated pawl carried on the end of the piston rod engaged by the trip lug of the air cylinder controlling the operation of the brake mechanism and in dotted lines its position when tripped by the lug.

Figure 11 is a fragmentary sectional elevation of the coupling bar mounted thereon, also the coupling latch hook of the trailer and the tripping lever, engaged by the trip lug of the air cylinder controlling the lifting of the latch hook.

The brake and coupling mechanism shown and described in this specification may be used upon any tractor-trailer for which it is adapted but it is particularly designed for use in connection with the device shown in my copending application filed March 12th, 1926, Serial #94,120, in which a hydraulic mechanism controlled from the cab of a tractor is adapted to raise or lower the supporting leg of a trailer.

Referring now to the reference characters placed upon the drawings:

A denotes a trailer and its sills 1 are preferably channel irons connected together by transverse members 2 bolted thereto. At the forward end of the trailer are brackets 16 including arc-shaped tracking members 16ª and rollers 17 journaled in the brackets. The arc-shaped tracking members 16ª are designed to ride up inclined skids 124 at the rear end of the tractor B, upon backing the latter into the trailer and in doing so the swinging supporting wheels 21 pivoted to the forward end of the trailer frame are lifted from the ground. A further backing movement of the tractor will result in the rollers 17 encountering the inclined turn-plate 101 of the fifth wheel C,—carried by the tractor,—which is normally inclined when the tractor is uncoupled from the trailer. This movement lifts the arc-shaped tracking members clear of the skids 124 and when the rollers 17—upon riding up the inclined turn-plate 101—pass the axis of the trunnions 120 supporting the fifth wheel, the latter will be forced backward to a horizontal position, as shown in Figure 1.

Pivoted on a stub shaft in brackets secured to one of the transverse members 2 of the trailer frame is a coupling or locking hook 70 adapted to engage a lock or coupling bar 100 bolted to the turn-plate 101 of the fifth wheel to couple the tractor and trailer together.

Sleeved upon the shaft of the coupling hook and co-operating therewith is a depending trip arm 71—diagrammatically indicated in Figure 1—adapted when operated in one direction to raise the coupling hook, thereby uncoupling the tractor from the trailer.

The upper turn-plate 101 of the fifth wheel is provided on its underside with an annular depending post 104 journaled in a collar 106 integral with the lower rocking plate 105. The upper turn-plate 101 has a depending annular rim 101ª to support the turn-plate in spaced relation to the floor of the rocking plate to provide a chamber in which air cylinders 108 and 114 are housed.

A manually actuated braking lever 69 pivoted to a segmental ratchet plate 68 at the forward end of the trailer operates a brake rod 67 connected with a lever 66 upon a shaft 62 supported in bearing brackets 65 attached to the side sills of the trailer frame. Sleeved upon the shaft 62 is a coiled spring 64 one end of which bears upon one of the brackets 65 and the other end of the spring against a slidable ratchet member 63,—with a depending arm 63ª,—to force it into coupling relation with a ratchet coupler 63¹. A lever 61 secured to the coupling element 61¹ has an elongated slot 61ª to receive a pawl pin 60 extending transversely through the end of a piston rod 58 projecting from a hydraulic cylinder 56 supported by the transverse beams connecting the side sills of the trailer. A pawl 59 on the pin 60 at the end of the piston rod 58 is in alignment with a slidable lug 115ª secured to the piston rod 115 of the air brake cylinder 114 attached to the upper turn-plate 101 of the fifth wheel.

Mounted on the tractor and controlled from the cab is a compressed air tank 125 and controlling valve 126 as installed on many trucks. Two air leads 113 and 118 extend from the control valve 126 to the air cylinders 108 and 114.

The air for operating the brake passes through flexible rubber piping 118ª through pipe 117 to the cylinder 114. It forces out the piston rod 115 to which is secured the lug 115ª projecting upwardly through a slot in the turn-plate 101. This lug contacts with the pawl 59 on the piston rod 58 projecting from the hydraulic cylinder 56.

A coiled spring 116 on the piston rod 115 bears at one end against the annular wall of the fifth wheel and at the other end against the lug 115ª and serves to return the piston to its initial position following the operation. A pipe 55 leading from the cylinder 56 is connected with the branch pipes 54—54 in turn respectively connected with the cylinders 52—52 fitted with piston rods 51—51 attached to the cam levers 50—50 controlling the operation of the brakes 14—14 on the rear wheels of the trailer.

Mounted upon the turn-plate 101 of the fifth wheel is a tripping lug 103 which upon backing the tractor into the trailer engages the depending arm 63ª of the ratchet coupling member 63 forcing it out of engagement with its co-operating member 63 thereby separating the ratchet members and releasing the brake for transit.

Secured to the frame are suitable stop brackets 18 adapted to secure the tilting plate in a horizontal plane when the trailer is locked to the tractor.

Having indicated the several parts by reference characters the construction and operation of the device will be readily understood.

Before coupling the tractor and trailer together the brake lever 69 pivoted to the ratchet member 68 is operated and when set is maintained in this position until the coupling operation is completed.

To couple the tractor to the trailer the tractor is backed in as straight a line as possible into the trailer. The arc-shaped tracking members 16ª upon contact with the mounting skids 124 lift the front end of the trailer and the supporting wheels 21. On continuing the backing movement the rollers 17 encounter the initially inclined plate 101 of the fifth wheel lifting the tracking members 16ª clear of the skids. When the rollers pass approximately the position indicated by a line a—a— see Figure 1—the fifth wheel is forced into a horizontal position as shown in that view.

As described in my previously referred to co-pending application this operation raises the supporting wheels, so also the operation by which the supporting wheels are again lowered—when uncoupling the tractor from the trailer—is there described, but as the same forms no part of the present invention it need not be repeated here.

The backing movement of the tractor and trailer is continued until the coupling hook 70 is in position to drop into engagement with the coupling latch bar 100, whereupon the lug 103 on the fifth wheel forces the arm 63ª of the clutch thereby separating the ratchet members 63—63. This action releases the brakes for transit and upon the trailer being coupled to the tractor further braking is then done from the cab of the tractor by means of the combined air and hydraulic system. The pawl 59 being in alignment with a lug 115ª contacts with it when air pressure actuates the piston rod 115. This action forces the piston into the cylinder 56 compressing the coiled spring 58 and forcing the fluid contents through the pipe 55 to the branch pipes 54—54. The fluid then flows into the cylinders 52—52 forcing out the piston rods 51—51 attached to the cam levers 50—50 causing the braking operation.

The valve 126 in the cab controls the two air leads 113 and 118 respectively extending from the compressed air tank 125 to the air brake cylinders 114 controlling the brake mechanism and also to the air cylinder 108 for tripping the locking hook 70 from coupling relation with the bar 100. The air for the brake passes through flexible rubber piping 118—118ª through pipe 117 to the cylinder 114 forcing the piston rod 115—to which is secured the lug 115ª projecting upwardly through a slot in the turn-plate 101. This lug contacts with the pawl 59 of the hydraulic system.

To uncouple the trailer the operator releases the air into the flexible rubber tubing 113ª that it may flow through the pipe 112 through the cylinder 108 forcing out the piston rod 109 to which is secured an off-set lug 110 projecting through an elongated slot in the turn-plate 101. This lug when the tractor and trailer are coupled together is in co-operating position with the trip lever 71 of the trailer. The action of the lug 110 serves to trip the lever 71 raising the coupling hook 70 out of engagement with the coupling bar 100. The tractor may now be pulled away from the trailer and the trailer supporting leg returned to a supporting position, as described in my co-pending application.

Having thus described my invention what I claim is:

1. In combination with a tractor-trailer; a hydraulic braking system carried by the trailer; means for manually operating said hydraulic braking system to set the brakes; co-acting means carried by the tractor and the trailer for automatically releasing said brakes upon backing the tractor into the trailer when coupling the latter to the tractor; a compressed air actuating system carried by the tractor, co-ordinating with the hydraulic braking system of the trailer, and automatically carried into and out of cooperative relation with the hydraulic braking system of the trailer by the coupling and uncoupling of the tractor and trailer, a controlling valve carried by the tractor for governing the operation of said compressed air system.

2. In combination with a tractor-trailer, a manually operated brake lever pivoted to a segmental rack plate carried by the trailer; a rock shaft journaled in the trailer frame; a clutch having one member keyed to the rock shaft; a hydraulic cylinder supported in the trailer frame, its piston rod connected with a rocking lever coupled with the other member of the clutch; a pair of brake cylinders connected with the hydraulic cylinder; brake mechanism for braking the rear wheels of the trailer connected with the piston rods of the brake cylinders; and coacting means carried by the tractor and the trailer and adapted to automatically release the clutch members upon backing the tractor into the trailer to couple the tractor to the trailer.

3. In combination with a tractor-trailer; a locking device carried by the trailer; a tiltable fifth wheel carried by the tractor having means adapted to co-ordinate with said locking means to effect a coupling relation between the tractor and trailer; an air cylinder carried by the fifth wheel; a slidable lug secured to the piston rod of the air cylinder adapted to engage said locking device; and a manually operated valve controlling the operation of the piston of the air cylinder, whereby said locking device may be operated to release the trailer from the tractor.

4. In combination with a tractor-trailer; a manually controlled hydraulic brake system carried on the trailer; means carried by the tractor for releasing said brake when coupled to the trailer; a compressed air system on the tractor adapted to co-ordinate with the hydraulic brake system of the trailer; a coupling device carried by the tractor; a locking device carried by the trailer adapted to automatically engage the coupling device of the tractor, upon backing the latter into the trailer; an air cylinder carried by the tractor; a tripping device carried by the piston rod of the air cylinder adapted to release said locking device; and a manually operated controlling valve carried by the tractor adapted to control the operation of the hydraulic brake and also the release of said locking means.

5. The combination of a tractor and trailer, a hydraulic braking system carried by the trailer, manually operable means also carried by the trailer for operating the hydraulic braking system, a compressed air actuating system carried by the tractor and co-ordinating with the hydraulic braking system of the trailer for operating said hydraulic system when the tractor and trailer are coupled, and means carried by the tractor and arranged to automatically engage the manually operable means of the trailer for disconnecting the same from the hydraulic braking system when the trailer and tractor are coupled.

In testimony whereof, I sign this specification.

CHARLES H. LAND.